No. 800,628. PATENTED OCT. 3, 1905.
H. P. CHILDRESS.
COTTON PICKER.
APPLICATION FILED JAN. 18, 1905.
5 SHEETS—SHEET 1.
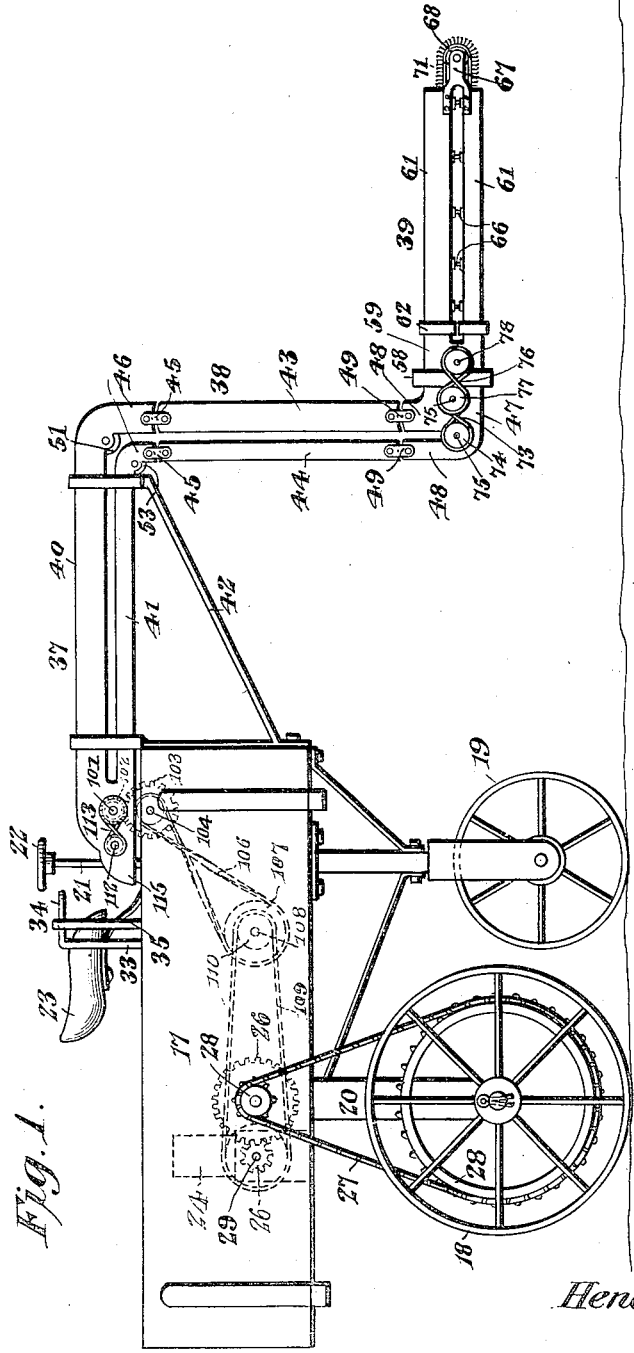
Fig. 1.
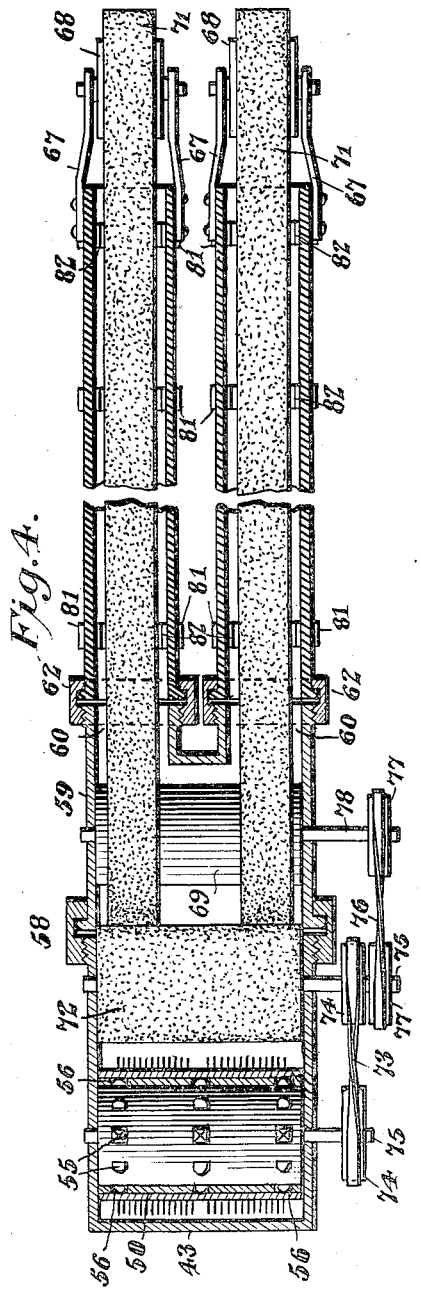
Fig. 4.
Henderson P. Childress, Inventor
Witnesses
By 
Attorney

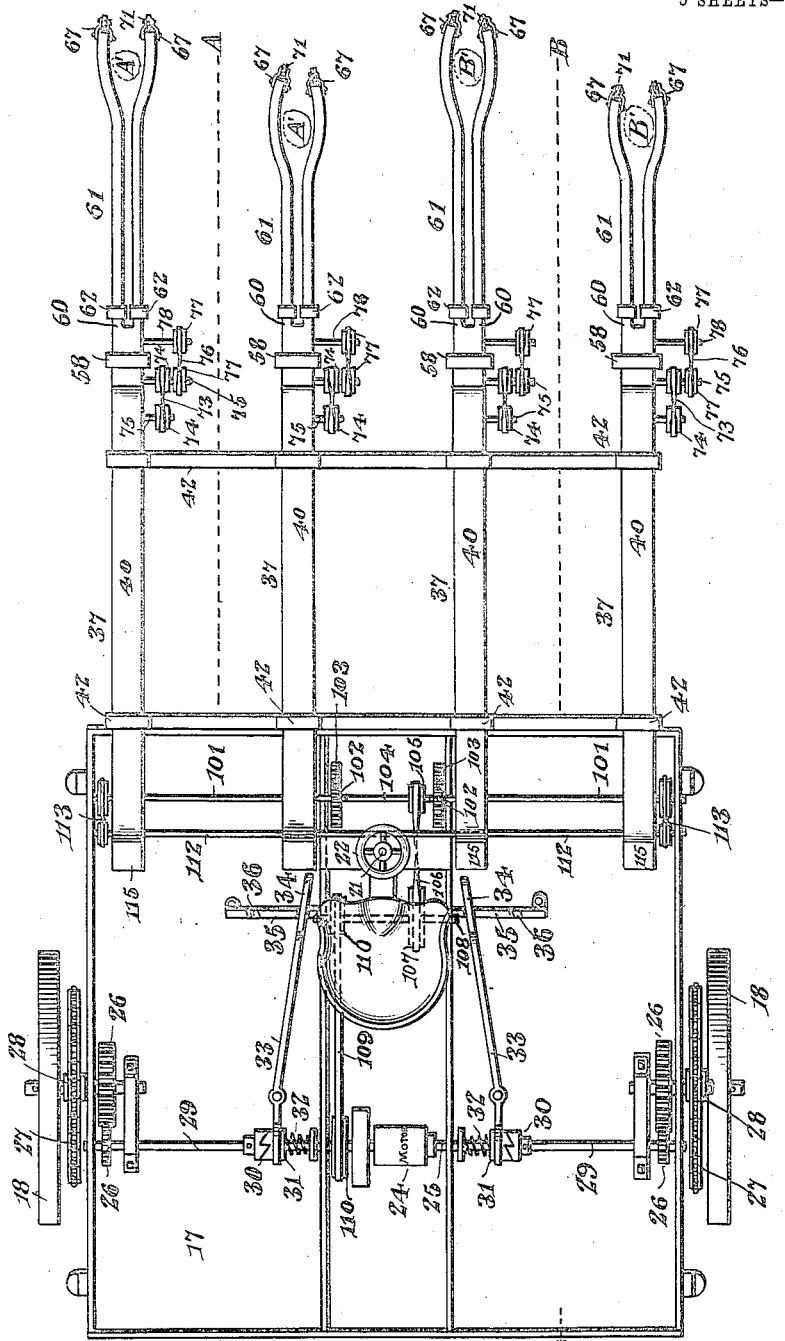

No. 800,628. PATENTED OCT. 3, 1905.
H. P. CHILDRESS.
COTTON PICKER.
APPLICATION FILED JAN. 18, 1905.
5 SHEETS—SHEET 3.
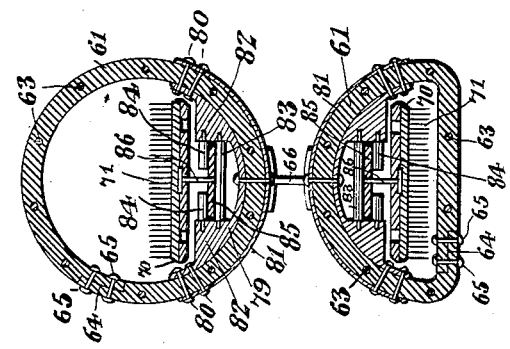
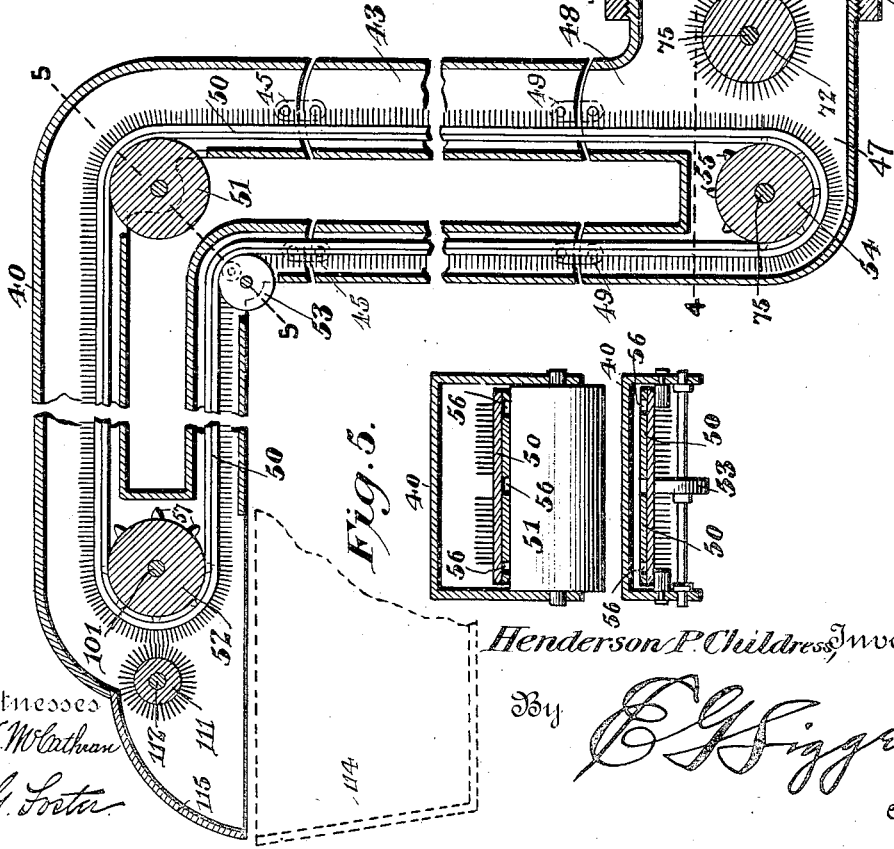
Henderson P. Childress, Inventor
Witnesses

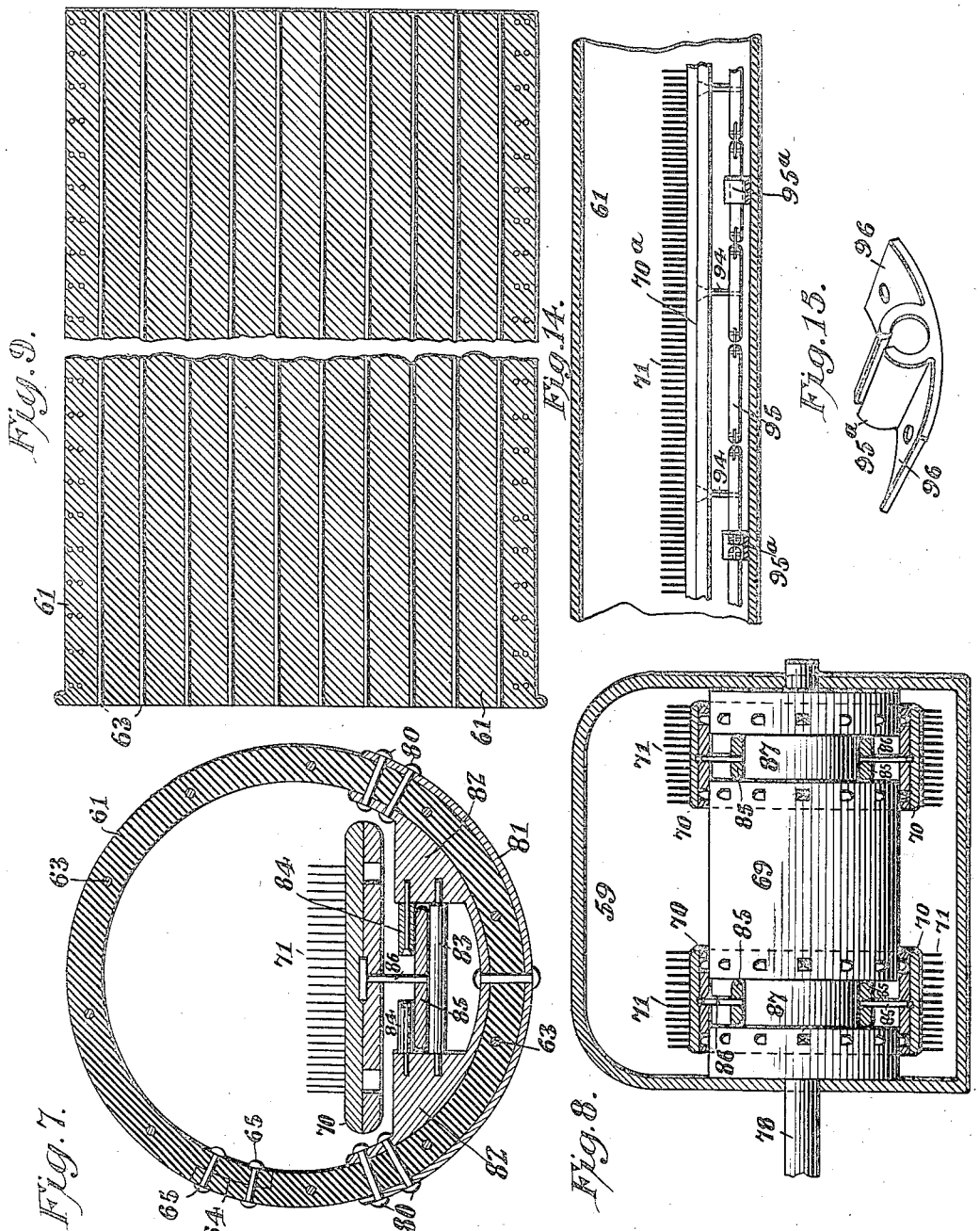

No. 800,628. PATENTED OCT. 3, 1905.
H. P. CHILDRESS.
COTTON PICKER.
APPLICATION FILED JAN. 18, 1905.
5 SHEETS—SHEET 5.
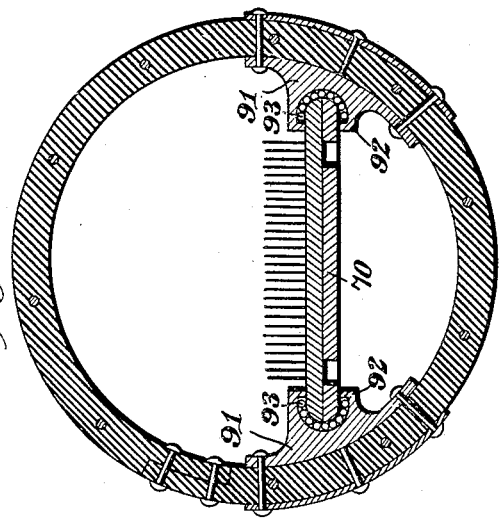
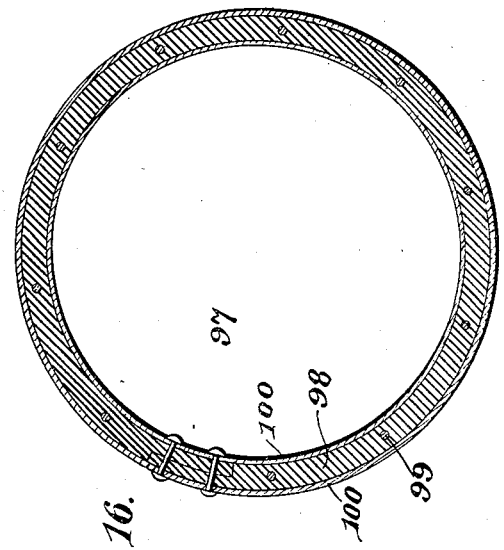
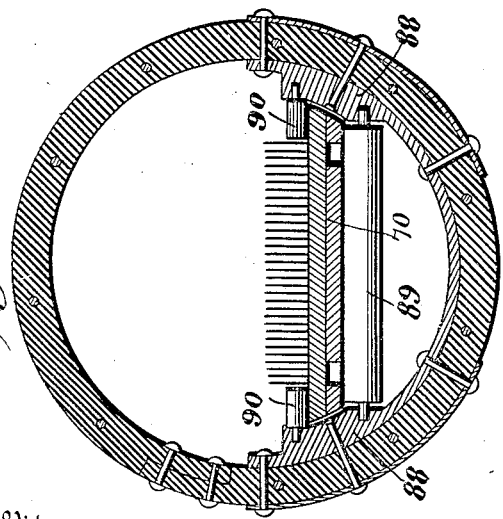
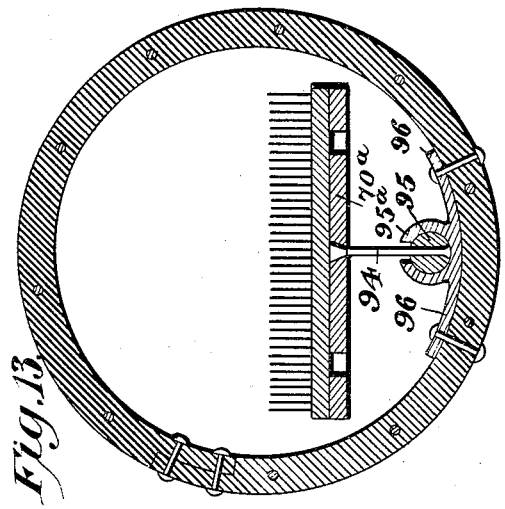
Henderson P. Childress, Inventor

UNITED STATES PATENT OFFICE.

HENDERSON P. CHILDRESS, OF BROOKLYN, NEW YORK.

COTTON-PICKER.

No. 800,628. Specification of Letters Patent. Patented Oct. 3, 1905.

Application filed January 18, 1905. Serial No. 241,690.

*To all whom it may concern:*

Be it known that I, HENDERSON P. CHILDRESS, a citizen of the United States, residing at Brooklyn, in the county of Kings and State of New York, have invented a new and useful Cotton-Picker, of which the following is a specification.

This invention relates more particularly to improvements in that type of picking-machines set forth in and covered by certain claims of an application filed by me on September 19, 1904, Serial No. 225,106, though there are features involved herein that are perhaps applicable to other types of pickers.

One of the objects in the present case is to provide novel mechanism of a simple nature for effecting the operation of the carrier or vehicle and of the picking mechanisms, the latter being operable independently of the former, so that the said carrier or vehicle can be stopped when an abnormal or exceptional growth of cotton is encountered, the picking mechanisms being still effective to pick such cotton.

Another and important object is to provide novel manually-directed picking means which is located in advance of the vehicle and has a comparatively great field of action relatively to the said vehicle in order that the operators can more readily secure all the cotton within range without materially interfering with the progress of the machine as a whole.

In the accompanying drawings, Figure 1 is a view in side elevation of one embodiment of the present invention. Fig. 2 is a top plan view of the same. Fig. 3 is a detail vertical longitudinal sectional view, on an enlarged scale, through one of the picking and conveying mechanisms. Fig. 4 is a horizontal sectional view taken on the line 4 4 of Fig. 3. Fig. 5 is a detail cross-sectional view taken on the line 5 5 of Fig. 3. Fig. 6 is a vertical cross-sectional view taken on the line 6 6 of Fig. 3. Fig. 7 is a detail sectional view on the line 7 7 of Fig. 3. Fig. 8 is a sectional view on the line 8 8 of Fig. 3. Fig. 9 is a longitudinal sectional view through the blank of which the flexible tube-section is formed. Fig. 10 is a cross-sectional view showing a slightly-modified form of construction. Fig. 11 is a detail sectional view through the guide-supporting means shown in Fig. 10. Fig. 12 is a cross-sectional view through another modification. Fig. 13 is a similar view of still another form of construction. Fig. 14 is a longitudinal sectional view showing a detail of the structure illustrated in Fig. 13. Fig. 15 is a perspective view of one of the guides. Fig. 16 is a cross-sectional view through a modified form of tube.

Similar reference-numerals designate corresponding parts in all the figures of the drawings.

In the embodiment illustrated a vehicle is provided comprising a body 17, supported on ground-wheels 18 and 19, the former being carried by an arched axle 20, similar to that illustrated in the aforementioned application. Said wheels 18 constitute the drivers for the vehicle, while the wheel 19 is a guide-wheel, being carried by the lower end of an upright shaft 21, having a hand-wheel 22 at its upper end, which hand-wheel is located in advance of a seat 23, mounted on the vehicle, and is in convenient relation to an operator seated thereon. A motor (shown generally at 24) is located on the rear portion of the body and may be of any desired or well-known type, an explosive-engine being perhaps preferable. This motor has the usual driving-shaft 25, which projects beyond opposite ends thereof. Suitable and independent sets of gearing 26 are connected to the drive-wheels 18 through the medium of sprocket-chains 27, operating on sprocket-wheels 28, carried by said drive-wheels, though other connections may be employed, if desired. One of the gears of each set is carried by a stub or counter-shaft 29, alined with the motor-shaft 25 and having a clutch element 30 thereon contiguous to one of the ends of said motor-shaft. The said ends of the motor-shaft are provided with clutch elements 31, coacting with the elements 30 and slidable upon the shaft 25, though rotating therewith. These clutch elements 31 are normally held in operative engagement with the elements 30 by means of coiled springs 32, though they may be moved out of such engagement by levers 33, connected thereto and having handle portions 34 disposed contiguous to the seat 23, and consequently in convenient relation to the operator. Rack elements 35, disposed on opposite sides of said seat, are provided with sockets 36, arranged to receive the handle portions 34, and thus maintain the clutch elements 31 either in or out of such engagement with their coacting clutch elements 30. It will thus be seen that while the elements are in engagement the wheels will be driven from the motor 24 and that when out of such engagement said motor may keep running and the wheels being disconnected therefrom will be at a standstill. Furthermore, either wheel may be disconnected independently of the other for the purpose of turning the machine about.

The cotton-picking mechanisms and means for conveying the picked cotton to the vehicle are supported upon the front portion of said vehicle and extend in advance of the same, in this respect being similar to the structure illustrated in the application to which reference has been made. A plurality of separate mechanisms is preferably employed, and as these are substantially duplicates a description of one is believed to be sufficient. A supporting member is mounted upon the front portion of the vehicle and comprises a stationary section 37, a hanger-section 38, and a manually-directed section 39. The stationary section consists of spaced tubes 40 and 41, mounted in a bracket-support 42, fastened upon the front of the vehicle and projecting beyond the same, this section being preferably, though not necessarily, disposed in substantially horizontal relation. The hanger-section 38 also consists of tubes 43 and 44, hingedly suspended, as shown at 45, at their upper ends from the outer depending ends 46 of the tubes 40 41. Hingedly connected to the lower ends of the tubes 43 44 is a head-tube 47, having upstanding portions 48, which are linked or otherwise pivotally connected to the ends of the tubes 43 44, as shown at 49. The two sections 37 and 38, together with the head 47, constitute supporting means for a conveyer-belt 50, the operative or carrying stretch of which passes upwardly through the tube 43 over a pulley 51 and through the tube 40, while the return stretch operates through the tubes 41 and 44 and through the upstanding portion 48 of the head. At the rear end of the stationary section 37 the said conveyer-belt 50 passes about a driving-pulley 52, and the return stretch at the outer end portion of the tube 40 passes about a suitable idler 53. The lower end of the belt passes around a pulley 54, by means of which power is transmitted to the cotton engaging or picking means hereinafter described. Therefore said pulley 54 is provided with teeth 55, that engage in sockets 56 in the inner face of the belt 50, said sockets also receiving the teeth 57 of the pulley 52, that constitutes the driving means for said belt, as is also hereinafter set forth.

Coupled to the head 47, as shown at 58, is a neck 59, divided into forwardly-extending tubular stems 60. To each of these stems is coupled a forwardly-extending manually-directed flexible tube 61, the couplings being shown at 62. These tubes, as shown particularly in Figs. 7 and 9, preferably comprise bodies of some yielding material, such as rubber, in which are embedded longitudinally-disposed rods 63, that normally maintain the said tubes straight and yet permit their flexing. These tubes, moreover, are preferably constructed of flat blanks the side margins of which are overlapped, as shown at 64, and secured together by rivets 65. The tubes are arranged in sets, each set comprising two tubes, one of which is arranged below the other, said tubes being connected by spaced couplings 66 and having at their outer free ends forwardly-projecting brackets 67, in which is journaled a pulley or roller 68. The neck 59 in rear of the stems 60 contains a roller 69, and passing about the roller 69 are picker-belts 70, having outer toothed cotton-engaging faces 71, said belts passing, respectively, through the sets of flexible tubes, having their outer portions projecting beyond said tubes and passing about the pulleys 68.

For the purpose of removing the cotton from the belts 70 a transferring-brush 72 is journaled in the front portion of the head 47 and coacts with the inner portion of said belt, this brush being driven by a belt 73, connecting pulleys 74, that are on the projecting shafts or gudgeons 75 of the pulley 54 and the brush 72. The pulley 69, and consequently the belts 70, are driven from the brush shaft or gudgeon 75 by a belt 76, passing about pulleys 77, one of which is located on said gudgeon or shaft 75, the other being arranged on a gudgeon 78, projecting from the pulley 69. Various means may be employed for retaining the belt in proper relation with respect to the flexible tubes 61 and without regard to the curvatures or relative positions which the same may attain. Probably the preferred form is illustrated in Figs. 3, 6, 7, and 8. As shown therein, spaced guides are employed, each comprising a supporting-base 79, secured transversely in the tube by rivets 80, this base being reinforced by a plate 81, located outside the tube. The said base 79 has spaced lugs 82, forming a passage-way between them. Such passage-way is bridged by a guide-roller 83, over which are arranged rollers 84, the ends of which are spaced apart. Between the rollers 83 and 84 passes a guide-belt 85, extending longitudinally within the belt 70 and connected thereto by links 86. These spaced guides, disposed at suitable intervals through the lengths of the tubes 61 and coacting with the guide-belts, serve to suitably retain the picking-belts in proper relation and yet permit the ready flexing of the tube. The passage of the guide-belts and connections about the rollers 68 and 69 is permitted by providing said rollers with annular grooves 87, which receive the said guide-belts and connections. A slightly different form of construction is illustrated in Figs. 10 and 11. In this construction each of the guides comprises a base 88, carrying guide-rollers 89 and 90, and in this instance the said rollers embrace the cotton-picking belt itself, and the necessity for the guide-belt and connections is therefore obviated. In Fig. 12 still another form of the invention is illustrated. Here spaced guiding devices 91 are provided having projecting portions 92, that embrace the belt, the said devices being furthermore provided with bearing-balls 93, that engage the edges and side margins of the belt to eliminate friction. A still different construction is shown in Figs. 13, 14, and 15. The belt (designated 70ᵃ) is connected by links 94 with a guide-belt 95, circular in cross-section and operating through guiding devices 96, secured to one wall of the tube and having lips 95ᵃ, that partially embrace the guide-belt, the space between the ends of said lips permitting the passage of the links. The structure of the flexible tubes may also be varied. An illustration of this is the embodiment shown in Fig. 16, wherein said tube is designated as a whole by the reference-numeral 97 and comprises a body 98 of flexible material, such as rubber, having rods 99 embedded therein and reinforced by facing-sheets 100 of suitable fabric. These various changes indicate how different features of the invention may be altered and modified without in any way affecting said invention.

For the purpose of actuating the various picking and conveying mechanisms a plurality of shafts 101 are employed, each of which in the present instance carries two of the pulleys 52. The inner ends of said shafts carry gear-wheels 102, meshing with larger gears 103 on a counter-shaft 104. This shaft has a pulley 105, operated upon by a belt 106, driven from a pulley 107, and a shaft 108, located beneath the seat of the driver. The shaft 108 is driven directly from the motor-shaft 25 through the medium of a belt 109 and pulleys 110. It will of course be understood that this gearing may be altered in various ways, the aim being merely to secure a comparatively high speed on the part of the picking and conveying mechanisms. For the purpose of removing cotton from the conveyer-belts 50, doffer-brushes 111 coact with the same at the rear ends of the stationary sections 37, these brushes being mounted on a shaft 112, which is connected to one of the shafts 101 by belting 113. The doffer-brushes 111 deposit the cotton in suitable baskets 114, which may be placed beneath hoods 115, located at the rear ends of the stationary sections 37.

The operation of the apparatus or machine may be briefly described as follows: The body of the vehicle is of sufficient height to pass freely over the plants, and the machine shown in the present embodiment is designed for picking two rows at a time. Thus in Fig. 2 one row of plants is indicated by the line A A, the other by the line B B. The operators for directing the picking mechanisms are located between the sets of tubes 61, those who are to pick the cotton on row A being designated A′ and those for row B being similarly designated B′. The motor being in operation and the clutches being in operative position, it will be seen that the driving-wheels 18 will be rotated, and consequently the vehicle will be propelled forwardly. The various cotton picking and conveying mechanisms will also be driven through the connections already described, and therefore as the operators direct the projecting ends of their respective cotton-picking belts to the different bolls the cotton will be removed from said bolls, carried to the transferring-brushes 72, which brushes will remove the same from the picking-belt and transfer the same to the conveyers. The conveyers in turn will elevate the cotton through the hanger-sections 43 and stationary sections 37 to the doffing-brushes, which will deposit the cotton in the baskets located beneath said brushes. The operators can of course freely bend the flexible sections, and thus secure the cotton, no matter what its position upon the plants, and if one of said operators is retarded the machine can still advance, as the hanger-sections will swing backwardly, and thus not interfere with the progress of the machine as a whole. If an exceptional growth of cotton is encountered, the operator upon the seat has only to unclutch the wheels from the motor, whereupon the vehicle will be stopped; but the cotton-picking mechanisms being still in operation the cotton may be as conveniently picked. When the ends of the rows are reached, the machine may turn in a small compass by unclutching one of the drive-wheels and turning the guide-wheel. This may be conveniently done by the operator, as will be apparent.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a cotton-picker, the combination with a carrier, of a support comprising relatively movable sections, one of said sections being connected to the carrier, the other being connected to the first-mentioned section and manually movable to different positions with respect to the carrier, and cotton picking and carrying means mounted on both sections, said means delivering the picked cotton from one section to the other and thence to the carrier.

2. In a cotton-picker, the combination with a carrier, of a supporting-section connected thereto, cotton-carrying means movably mounted on the supporting-section, a manually-directed section connected to the supporting-section, and cotton-picking means mounted on the latter section and delivering to the carrying means.

3. In a cotton-picker, the combination with a carrier, of a support comprising relatively movable sections, cotton engaging and carrying means movably mounted on both sections, and transporting the cotton from one to the other, a motor mounted on the carrier for operating said means on both sections, and cotton-picking mechanism supported on one of the sections and delivering to said carrying means.

4. In a cotton-picker, the combination with a carrier, of a support comprising relatively movable sections, cotton engaging and carrying belting movably mounted on both sections and movable longitudinally thereof, said belting carrying the cotton from one section to the other, a motor mounted on the carrier and having gear connections with the belting for operating the same, and cotton-picking mechanism movably mounted on the support and delivering to the said belting.

5. In a cotton-picker, the combination with a carrier, of a flexible support, a cotton engaging and carrying belt movably mounted on the support and flexing therewith, a motor mounted on the carrier and having gear connections with the belt for operating the same, and manually-directed cotton-picking mechanism delivering to said belt.

6. In a cotton-picker, the combination with a support including hinged sections, of cotton picking and carrying means including a belt that is movably mounted on both sections and bridges the joint between them.

7. In a cotton-picker, the combination with a support having hinged sections, of cotton picking and carrying means including a belt that is movably mounted on both sections and bridges the joint between them, a belt-guide disposed contiguous to the hinge connection or joint, and a motor having driving connections with the belt.

8. In a cotton-picker, the combination with a carrier, of cotton-picking mechanism mounted thereon, said mechanism including a movable supporting-section, a flexible section connected thereto, and cotton engaging and carrying means mounted on both sections and movable longitudinally thereof.

9. In a cotton-picker, the combination with a carrier, of cotton-picking mechanism mounted thereon, said mechanism including movably-connected sections movably supported from the carrier, and cotton engaging and carrying means mounted on said sections and movable longitudinally thereof.

10. In a cotton-picker, the combination with a carrier, of cotton-picking mechanism mounted thereon, said mechanism including hingedly-connected sections, one of which is hingedly connected to the carrier, and cotton engaging and carrying means mounted on both of said sections.

11. In a cotton-picker, the combination with a carrier, of cotton-picking mechanism mounted thereon, said mechanism including a depending hanger-section, a section hingedly connected thereto, and cotton engaging and carrying means supported upon both of said sections.

12. In a cotton-picker, the combination with a carrier, of cotton-picking mechanism mounted thereon, said mechanism including a depending swinging hanger-section, a flexible manually-directed section connected to the lower portion thereof, and a cotton engaging and carrying belt mounted on said flexible section.

13. In a cotton-picker, the combination with a carrier, of cotton-picking mechanism mounted thereon, said mechanism including a swinging hanger-section, a tubular flexible section connected thereto, and a cotton engaging and carrying belt mounted on the flexible section.

14. In a cotton-picker, the combination with a carrier, of cotton-picking mechanism mounted thereon, said mechanism including a movable tubular hanger-section, a manually-directed section connected thereto, and cotton engaging and carrying means supported on both sections.

15. In a cotton-picker, the combination with a carrier, of cotton-picking mechanism mounted thereon, said mechanism including a tubular hanger-section movably supported from the carrier, a manually-directed section supported on the hanger-section, and cotton engaging and carrying belting passing through said sections.

16. In a cotton-picker, the combination with a carrier, of cotton-picking mechanism mounted thereon, said mechanism including a tubular hanger-section supported from the carrier, a manually-directed section connected to the hanger-section, a conveyer-belt mounted in the hanger-section, and cotton-engaging means mounted on the manually-directed section and coacting with the conveyer-belt.

17. In a cotton-picker, the combination with a carrier, of cotton-picking mechanism mounted thereon, said mechanism including a tubular hanger-section pivotally supported upon the carrier, a manually-directed section connected to said hanger-section, a cotton-engaging belt mounted in the manually-directed section, and a conveyer-belt passing through the hanger-section.

18. In a cotton-picker, the combination with a carrier, of cotton-picking mechanism mounted thereon, said mechanism including a supporting-section, a conveyer carried thereby, a section connected to said supporting-section, cotton-engaging means carried by said latter section, and means for transferring cotton from such engaging means to the conveyer.

19. In a cotton-picker, the combination with a carrier, of cotton-picking mechanism mounted thereon, said mechanism including a tubular hanger-section, a tubular manually-directed section connected thereto, a conveyer-belt operating in the hanger-section, a picker-belt operating in the manually-directed section, and a transferring-brush removing the cotton from the picker-belt and delivering it to the conveyer-belt.

20. In a cotton-picker, the combination with a carrier, of cotton-picking mechanism mounted thereon, said mechanism including a hanger-section pivotally suspended at its upper end from the carrier, a flexible manually-directed section carried thereby, an endless conveyer-belt operating through the hanger-section, an endless picker-belt operating through the flexible section, a transferring-brush interposed between the belts, and means for driving said belts and brush.

21. In a cotton-picker, the combination with a carrier, of cotton-picking mechanism mounted thereon, said mechanism including a stationary section mounted on the carrier, a hanger-section swingingly suspended from the stationary section, a manually-directed section connected to the lower portion of the hanger-section, cotton-engaging means movably mounted on the manually-directed section, and conveyer mechanism coacting with said engaging means and operatively mounted on the hanger and stationary sections.

22. In a cotton-picker, the combination with a carrier, of cotton-picking mechanism mounted thereon, said mechanism including a stationary section mounted on the carrier, a hanger-section swingingly suspended therefrom, cotton-engaging means supported from the hanger-section, and a conveyer coacting with said engaging means and supported on the hanger and stationary sections.

23. In a cotton-picker, the combination with a carrier, of cotton-picking mechanism mounted thereon, said mechanism including a tubular stationary section mounted on the carrier, a hanger-section swingingly suspended therefrom, a conveyer-belt operating through both of said sections, and cotton-engaging means movably supported on the lower end of the hanger-section and coacting with the conveyer-belt.

24. In a cotton-picker, the combination with a carrier, of cotton-picking mechanism mounted thereon, said mechanism including a stationary section mounted on the carrier and comprising spaced tubes, a hanger-section suspended from the stationary section and comprising spaced tubes, a head supported on the free end of the hanger-section, a conveyer-belt passing through the tubes of said sections and through the head, a flexible manually-directed tubular section connected to the head, a cotton-engaging belt carried by said section and projecting from the free end thereof, and a transferring-brush mounted in the head and coacting with the cotton-engaging belt and conveyer.

25. In a cotton-picker, the combination with a vehicle, of a plurality of cotton-picking mechanisms carried thereby, said mechanisms including a plurality of stationary sections mounted on the vehicle, a plurality of manually-directed movably-supported hanger-sections suspended from said stationary sections and having portions movable laterally to different positions with respect to the vehicle, conveyer mechanism operating through the said various sections, and cotton-engaging means movably mounted on the lower portions of the hanger-sections and coacting with the conveyer mechanism.

26. In a cotton-picker, the combination with a vehicle, of a plurality of stationary tubular sections carried by and projecting in advance of the vehicle, a plurality of tubular hanger-sections suspended from the outer ends of the stationary sections, a plurality of tubular manually-directed sections connected to the lower ends of the hanger-sections, and cotton picking and conveying means projecting from the front ends of the manually-directed sections and operating through said various sections.

27. In a cotton-picker, the combination with a carrier, of a supporting member supported therefrom, pulleys, a cotton-engaging belt movable through said member and passing about the pulleys, and a plurality of spaced guides for the belt located on the inner side of said member between the pulleys and engaging the same stretch of said belt at intervals between the pulleys.

28. In a cotton-picker, the combination with a carrier, of a flexible supporting member supported therefrom, a cotton-engaging belt movable through said member and projecting beyond the same, said belt flexing with the member, and spaced guides for the belt carried by said member and engaging the belt at intervals, said guides permitting the flexing of the member and of the belt therewith.

29. In a cotton-picker, the combination with a vehicle, of a supporting member projecting therefrom, pulleys located upon the member, a cotton-engaging belt movable upon said member and having a cotton picking and carrying face, said belt passing about the pulleys, and spaced guides located on said member between the pulleys and engaging the same stretch of the belt.

30. In a cotton-picker, the combination with a carrier, of a hanger-section, a tubular manually-directed section connected to the hanger-section, a cotton-picking belt, spaced pulley-supports for said belt, and spaced guides for the belt located between the pulley-supports and engaging the margins of the same stretch of the belt.

31. In a cotton-picker, the combination with a carrier, of a supporting member mounted thereon and including a hanger-section and an outstanding flexible tubular section, a cotton-picking belt operating through the tubular section, spaced pulleys for supporting the belt, and spaced guiding devices mounted in the tubular section and engaging the same stretch of belt between the pulleys, said guiding devices permitting the flexing of the section and said belt projecting beyond the section.

32. In a cotton-picker, the combination with a carrier, of a supporting member mounted thereon and including a flexible manually-directed section, pulleys located at the ends of said section, a cotton-picking belt operating through the section and projecting therefrom, and spaced roller-guides coacting with the same stretch of the belt between the pulleys.

33. In a cotton-picker, the combination with a vehicle, of a supporting member including a hanger-section, a conveyer operating through said hanger-section, a tubular flexible manually-directed section connected to the hanger-section, pulleys located at the ends of the latter section, a cotton-picking belt operating through said latter section, a transferring-brush removing the cotton from the picking-belt and delivering it to the conveyer, and spaced roller-guides located in the flexible tubular section and coacting with the belt, said guides permitting the flexing of the section.

34. In a cotton-picker, the combination with a vehicle including a body having ground-wheels, of a motor supported on the body, gear connections between the motor and certain of the ground-wheels, said connections including clutches, a plurality of supporting members projecting from the front end of the body, each of said members comprising a stationary section, a hanger-section suspended therefrom, and a flexible manually-directed section connected to the lower end of the hanger-section, conveyer-belts operating through the stationary and hanger sections, doffing-brushes coacting with the conveyer-belts, means for driving said doffing-brushes and conveyer-belts from the motor, cotton-picking belts operating through the manually-directed sections, transferring-brushes for delivering the picked cotton from the picking to the conveyer belts, and driving connections between the conveyer-belts, the transferring-brushes, and the picker-belts.

35. In a cotton-picker, the combination with a carrier, of cotton-conveying mechanism mounted thereon and projecting therefrom, the projecting portions of said conveying mechanism being movable to different positions with respect to the carrier, picking mechanism associated with said conveying mechanism and comprising a cotton-picking belt, and means for delivering the picked cotton from said belt to the conveying mechanism.

36. In a cotton-picker, the combination with a carrier, of cotton-conveying mechanism mounted thereon and including a tubular portion, and a picking-belt movably mounted on one end of the said tubular portion and delivering the picked cotton thereinto.

37. In a cotton-picker, the combination with a carrier, of cotton-conveying mechanism mounted thereon and projecting therefrom, the outer projecting end of said conveying mechanism being movable to different positions with relation to the carrier, picking mechanism associated with said outer end of the conveying mechanism and comprising a cotton-picking belt, and a doffer-brush coacting with the picking-belt for removing the cotton therefrom to permit its movement by the conveying mechanism.

38. In a cotton-picker, the combination with a conducting-tube, of a cotton-picking belt movably mounted on the end thereof, and a driving-belt operating longitudinally of the tube and having operative connections with the picking-belt to drive the same.

39. In a cotton-picker, the combination with a conducting-tube, of a cotton-picking belt movably mounted on the end thereof, a doffer-brush coöperating with the inner end of the picking-belt to remove the picked cotton therefrom and deliver it to the tube, and means for driving the brush and belt.

40. In a cotton-picker, the combination with a carrier, of a flexible conducting-tube projecting therefrom, a picking-belt support mounted on the free outer end of the tube, a cotton-picking belt movably mounted on said support, a doffing-brush located at the inner end of the belt for removing the picked cotton therefrom and delivering it to the tube, and a belt for driving the cotton-picking belt and the doffing-brush.

41. In a cotton-picker, the combination with a carrier, of a manually-directed support projecting from the carrier and being capable of free lateral movement with respect thereto, a cotton-carrying belt, and cotton-picking means mounted on the support separately from the cotton-carrying belt and delivering thereto.

42. In a cotton-picker, the combination with a carrier, of a manually-directed support projecting from the carrier and freely movable from side to side, a cotton-carrying belt, a pulley about which the belt passes, and cotton-picking mechanism mounted on the support in advance of said pulley and delivering to the portion of the belt passing around the same.

43. In a cotton-picker, the combination with a carrier, of a supporting member extending therefrom, a cotton-carrying belt movably operating through the member, and cotton-picking mechanism movably mounted on the member in advance of the belt and delivering to said belt.

44. In a cotton-picker, the combination with a carrier, of a tubular supporting member extending therefrom and comprising sections, a cotton-carrying belt movably operating through certain of the sections, and cotton-picking mechanism movably mounted on one of the sections in advance of the belt and delivering to said belt.

45. In a cotton-picker, the combination with a tubular support, of a cotton-carrying belt mounted thereon and operating therethrough, cotton-picking means also mounted on the support and delivering to the belt, means connecting the belt and the picking means for operating the latter from the former, and means connected to the rear portion of the belt for operating the same.

46. In a cotton-picker, the combination with a support comprising relatively movable sections, of a cotton-carrying belt mounted on the support and bridging the joint between certain of the sections, picking means mounted on one of the sections in advance of the belt, connections between the belt and picking means for operating the latter, and means for driving the belt.

47. In a cotton-picker, the combination with a support comprising tubular sections, of hinge connections between the sections, a pulley mounted on one of the sections, a cotton-carrying belt passing about the pulley and bridging the joint between certain of the sections, cotton-picking means mounted on one of the sections in advance of the pulley, and connections between said pulley and cotton-picking mechanism for driving the latter from the former.

48. In a cotton-picker, the combination with a vehicle, of a tubular support projecting therefrom and comprising hingedly-connected sections, a cotton-carrying belt operating through certain of the sections and delivering to the vehicle, a motor mounted on the vehicle and connected to the rear portion of the belt for operating the same, cotton-picking means mounted on one of the sections and delivering to the belt, and means connecting the belt and picking means for operating the latter from the former.

In testimony that I claim the foregoing as my own I have hereto affixed my signature in the presence of two witnesses.

HENDERSON P. CHILDRESS.

Witnesses:
    HERBERT J. KING,
    OGDEN W. RING.